United States Patent
Anti et al.

(10) Patent No.: US 12,044,550 B2
(45) Date of Patent: Jul. 23, 2024

(54) METHOD OF COMPENSATING TEMPERATURE INFLUENCE IN CAPACITIVE MEASUREMENTS

(71) Applicant: IEE INTERNATIONAL ELECTRONICS & ENGINEERING S.A., Echternach (LU)

(72) Inventors: Baptiste Anti, Hettange-Grande (FR); Heinrich Gierens, Trier (DE); Christian Urig, Püttlingen (DE); Christoph Wendt, Mettendorf (DE); Lukas Hillay, Kosice (SK); Dirk Johannes Thomas, Trier (DE); Jan Liptak, Vlachovo (SK)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 0 days.

(21) Appl. No.: 17/057,934

(22) PCT Filed: May 23, 2019

(86) PCT No.: PCT/EP2019/063302
§ 371 (c)(1),
(2) Date: Nov. 23, 2020

(87) PCT Pub. No.: WO2019/224291
PCT Pub. Date: Nov. 28, 2019

(65) Prior Publication Data
US 2021/0262838 A1    Aug. 26, 2021

(30) Foreign Application Priority Data

May 23, 2018 (LU) .......................... 100804
Aug. 8, 2018 (LU) .......................... 100901

(51) Int. Cl.
*G01D 18/00* (2006.01)
*G01N 27/22* (2006.01)

(52) U.S. Cl.
CPC ......... *G01D 18/008* (2013.01); *G01N 27/221* (2013.01)

(58) Field of Classification Search
CPC ........ G01D 3/032; G01D 5/24; G01D 5/2405; G01D 18/00; G01D 18/008; G01N 27/221
See application file for complete search history.

(56) References Cited

U.S. PATENT DOCUMENTS

| | | | |
|---|---|---|---|
| 4,751,654 A | 6/1988 | Lyyra | |
| 7,006,938 B2 * | 2/2006 | Laraia | ................ G01D 18/008 73/1.88 |

(Continued)

FOREIGN PATENT DOCUMENTS

| | | |
|---|---|---|
| DE | 10123303 A1 | 4/2002 |
| GB | 2439236 A | 12/2007 |

OTHER PUBLICATIONS

International Search Report corresponding to International Application No. PCT/EP2019/063302, dated Aug. 13, 2019, 4 pages.

(Continued)

*Primary Examiner* — Alvaro E Fortich
*Assistant Examiner* — Martin Walter Braunlich
(74) *Attorney, Agent, or Firm* — Reising Ethington P.C.

(57) ABSTRACT

A method of operating a capacitive measurement system for compensation of temperature influence is described. The capacitive measurement system includes at least one capacitive sensor member in an installed state and a capacitive measurement circuit for determining a complex impedance of an unknown capacitance from a complex sense current through the at least one capacitive sensor member. In the (Continued)

method, a calibration measurement is carried out to obtain temperature characteristics of both the real part and the imaginary part of determined impedances. In following impedance measurements of the unknown capacitance at a current temperature, the real part and the imaginary part of the measured impedance is determined, and based on the real part determined at the current temperature and the determined temperature characteristics of both the real part and the imaginary part, the imaginary part of the impedance determined at the current temperature is corrected.

10 Claims, 5 Drawing Sheets

(56) References Cited

U.S. PATENT DOCUMENTS

| 7,911,345 B2* | 3/2011 | Potyrailo | G01N 33/0006 |
| | | | 340/10.5 |
| 9,764,668 B2* | 9/2017 | Lamesch | B60N 2/5678 |
| 2009/0278685 A1 | 11/2009 | Potyrailo et al. | |
| 2018/0087929 A1* | 3/2018 | Matsumura | G01D 5/24 |

OTHER PUBLICATIONS

Written Opinion corresponding to International Application No. PCT/EP2019/063302, dated Aug. 13, 2019, 6 pages.
J. R. Smith et al., "Electric Field Sensing for Graphical Interfaces", IEEE Computer Graphics and Applications, 18(3), pp. 54-60, dated in 1998.

* cited by examiner

METHOD OF COMPENSATING TEMPERATURE INFLUENCE IN CAPACITIVE MEASUREMENTS

TECHNICAL FIELD

The invention relates to a method of operating a capacitive measurement system for compensation of temperature influences, a capacitive measurement system with compensation of temperature influences and a software module for automatically carrying out the method.

BACKGROUND OF THE INVENTION

Capacitive measurement and/or detection systems have a wide range of applications, and are among others widely used for the detection of the presence and/or the position of a conductive body in the vicinity of an electrode of the system. A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon establishes an electric field into a region of space proximate to the antenna electrode, while the sensor is operating. The sensor comprises at least one sensing electrode—which could comprise the one or more antenna electrodes themselves—at which the influence of an object or living being on the electric field is detected.

The different capacitive sensing mechanisms are, for instance, explained in the technical paper entitled "Electric Field Sensing for Graphical Interfaces" by J. R. Smith et al., published in IEEE Computer Graphics and Applications, 18(3): 54-60, 1998, which document shall hereby be incorporated by reference in its entirety with effect for the jurisdictions permitting incorporation by reference. The paper describes the concept of electric field sensing as used for making non-contact three-dimensional position measurements, and more particularly for sensing the position of a human hand for purposes of providing three-dimensional positional inputs to a computer. Within the general concept of capacitive sensing, the author distinguishes between distinct mechanisms he refers to as "loading mode", "shunt mode", and "transmit mode", which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", which is alternatively referred to as "coupling mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling.

The capacitive coupling may be determined by applying an alternating voltage signal to a capacitive antenna electrode and by measuring the current flowing from the antenna electrode either towards ground (in the loading mode) or into the second electrode (receiving electrode) in case of the coupling mode. This current may be measured by means of a transimpedance amplifier, which is connected to a sensing electrode and which converts a current flowing into the sensing electrode into a voltage, which is proportional to the current flowing into the antenna electrode.

One important field of application of capacitive measurement and/or detection systems is the automotive industry. For instance, capacitive vehicle seat occupancy detection systems are nowadays widely used in vehicles, in particular in passenger cars, for providing a seat occupancy signal for various safety-related assistance systems, for instance for the purpose of a seat belt reminder (SBR) system or an activation control for an auxiliary restraint system (ARS), such as an airbag. Another safety-related system employing capacitive sensors are hands on detection (HoD) systems, assisting in detecting positions of a driver's hands on a vehicle steering wheel.

As detection results of some of the mentioned systems are safety-related, maintaining operational reliability and capability under various ambient conditions is essential. As an example, a detection result must not depend on variation of an ambient temperature, the influence of which therefore has to be compensated for.

In conventional capacitive detection systems, this is accomplished by a separate member, which has a temperature-dependent property and may, for instance, be formed as a thermistor. The temperature-dependent property, which in case of a thermistor may be an electrical resistance, is determined to draw conclusions on a temperature of a region surrounding the separate member.

SUMMARY

It is therefore an object of the invention to provide a method for operating a capacitive measurement system that includes a temperature compensation without the need for an extra temperature-sensitive sensor member.

Temperature compensation in conventional capacitive detection systems usually employs a temperature value determined by an additional temperature sensor. For example, a conventional capacitive detection system having a capacitive sensor measures a complex impedance Z of the capacitive sensor at a temperature $T_1$ which is different from a reference temperature $T_{ref}$:

$$Z(T_1) = X(T_1) + i \cdot Y(T_1)$$

Herein, the imaginary part of the measurement represents the reactance, which in this case is a capacitance, and the real part of the measurement represents the electric resistance.

It is noted that instead of determining complex impedances from measured currents, the capacitive detection system may be configured to determine complex admittances from measured currents without any change of the disclosed subject-matter of the invention, as the real parts and the imaginary parts of a complex impedance and its corresponding complex admittance are interrelated by a one-to-one correspondence, as will readily be appreciated by those skilled in the art.

In a fixed configuration of the capacitive detection system, both the capacitance and the resistance that are to be determined may be temperature-dependent due to a potential temperature-dependency of a material employed in the capacitive sensor or a material nearby the capacitive sensor. Examples are the electric permittivity of a spacer material, or a surface resistance of an employed sensor electrode, depending on the application. In the automotive field, materials used in a vehicle seat or a steering wheel are specific examples. The temperature-dependency of the materials influences the capacitive measurement and generates a drift in the measurement as the temperature changes.

In a conventional capacitive detection system, the capacitance measured at temperature $T_1$ different from $T_{ref}$ may be corrected to relate the measured capacitance to the reference temperature $T_{ref}$ by adding a correction term. In case of an often used linear correction, this correction term is a product of a constant number and the distance in temperature $\Delta T$:

$$\Delta T = T_{ref} - T_1$$

between the temperature $T_1$ and the reference temperature $T_{ref}$. The constant number can be obtained from a calibration measurement and may for instance be the first derivative of the capacitance development with temperature as measured in the calibration measurement, taken at the reference temperature $T_{ref}$:

$$A = \left.\frac{dY(T)}{dT}\right|_{T=T_{ref}}.$$

Thus, the corrected measured capacitance that is related to the reference temperature $T_{ref}$ is given by:

$$Y(T_{ref}) = Y(T_1) + A \cdot \Delta T,$$

wherein A is obtained by calibration and $\Delta T$ is the result of a measurement by the required additional temperature sensor, carried out preferably at a point in time close to the capacitance measurement by the capacitance sensor.

In one aspect of the present invention, the object is achieved by a method of operating a capacitive measurement system for compensation of temperature influence, wherein the capacitive measurement system includes at least one capacitive sensor member in an installed state and a capacitive measurement circuit. The capacitive measurement circuit is configured for determining a complex impedance of an unknown capacitance from a complex sense current through the at least one capacitive sensor member.

The phrases "configured to" and "configured for", as used in this application, shall in particular be understood as being specifically programmed, laid out, furnished or arranged.

The method comprises at least the following steps:

carrying out a calibration measurement by:
- determining a plurality of complex impedances at a plurality of different temperatures, at least one complex impedance for each temperature, wherein a range of the plurality of different temperatures includes a reference temperature, and
- determining temperature characteristics of both the real part and the imaginary part of the determined impedances, carrying out an impedance measurement of the unknown capacitance at a current temperature and determine the real part of the measured impedance, and based on the real part determined at the current temperature and the determined temperature characteristics of both the real part and the imaginary part, correcting the imaginary part of the impedance determined at the current temperature.

Advantageously, the calibrated temperature characteristics of the real part and the imaginary part of a complex impedance and the real part of an impedance determined by a capacitive measurement system at a current temperature can be exploited to determine a compensation for the imaginary part of the impedance determined by the capacitive measurement system at the current temperature. The compensation can be used to correct the imaginary part of the complex impedance determined by the capacitive measurement system such as if it were determined by the capacitive measurement system at the reference temperature.

In this way, a method for operating a capacitive measurement system with a compensation of temperature-induced changes of material properties and, by that, a stable operation over an operational temperature range can be provided without the need of an extra temperature-sensitive sensor member.

As will be readily acknowledged by those skilled in the art, the complex sense current through the at least one capacitive sensor is indicative of an unknown impedance that may represent a position of an object relative to the at least one capacitive sensor member.

The method of operating a capacitive measurement system proposed herein is beneficially applicable to all capacitive measurement systems, particularly for capacitive measurement systems designed for automotive applications, such as e.g. capacitive Hands-Off detection systems to be integrated in the steering wheel of the vehicle or capacitive passenger detection systems to be integrated in a vehicle seat.

The compensation for correcting the imaginary part of the complex impedance can for instance be determined directly by establishing a relation between the determined temperature characteristic of the real part and the determined temperature characteristic of the imaginary part of the complex impedance. For instance, the established relation may be formed by a ratio of slopes of the temperature characteristics at least in a temperature interval. The compensation for correcting the imaginary part of the complex impedance can as well be determined indirectly by obtaining a current temperature from the determined real part of the measured impedance and the determined temperature characteristic of the real part and using the obtained current temperature and the determined temperature characteristic of the imaginary part of the determined impedance. Both these ways are considered to be within the scope of the invention.

In preferred embodiments of the method, the step of correcting the determined imaginary part includes obtaining a current temperature from the real part of the impedance determined at the current temperature and the determined temperature characteristic of the real part, and using the obtained current temperature and the determined imaginary part temperature characteristic for determining a correction amount for the imaginary part.

Although this method includes an additional step of obtaining the current temperature, it is quite beneficial in cases in which at least one of the determined temperature characteristics is at least partially non-linear.

Preferably, the step of correcting the determined imaginary part of the determined impedance is carried out according to linear transfer function $$Y_{ref} = Y_{curr} + X_{curr} \cdot a_1 + a_0$$

wherein $Y_{ref}$ denotes the corrected imaginary part of the impedance related to the reference temperature, $Y_{curr}$ denotes the uncorrected imaginary part of the impedance determined at the current temperature, $X_{curr}$ denotes the real part of the impedance determined at the current temperature, and $a_0$ and $a_1$ are constant numerical values obtained from the calibration measurement.

This embodiment of the method includes a linear correction, which can quickly be carried out and in many cases is sufficient for temperature deviations from the reference temperature within a suitable operational temperature range.

The formula above can be transformed into $$Y_{ref} = Y_{curr} + a_1' \cdot (X_{ref} - X_{curr}) + a_0'$$

with $$a_0 = a_0' + a_1' \cdot X_{ref}$$

$$a_1 = -a_1'$$

wherein $X_{ref}$ denotes the real part at the reference temperature from the real part temperature characteristics, showing more clearly that the correction of the imaginary part is based on a numerical product of the deviation of the real part determined at the current temperature from the real part at the reference temperature and a numerical constant derived from a ratio of the slope of the determined temperature characteristic of the imaginary part and the slope of the determined temperature characteristic of the real part of the determined impedance, respectively. Numerical constant $a_0'$ serves as an offset adaptation. It is worth noting, however, that this correction of the imaginary part of the determined impedance does not depend on explicitly obtaining the current temperature.

Preferably, numerical constant $a_1$ represents a ratio of the slopes at a temperature between and including the reference temperature and the current temperature.

In preferred embodiments, the step of determining the temperature characteristics includes applying a fitting procedure on the real parts of the determined impedances and applying a fitting procedure on the imaginary parts of the determined impedances to obtain a closed formula for describing the respective temperature characteristics. This can allow for a fast determination and execution of a correction of the imaginary part of the impedance determined at the current temperature either by a simplified calculation of numerical constants or determination of the current temperature, respectively.

Preferably, the closed formula obtained by the fitting procedure is formed as a polynomial of the temperature. This can allow for a representation of a temperature characteristic that is easy to handle numerically. Most preferably, the closed formula comprises orthogonal polynomials, which can allow for easily increasing an accuracy of the representation of the temperature characteristic, such as, but not limited to, the Hermite polynomials, the Laguerre polynomials, the Jacobi polynomials, the Chebyshev polynomials and the Legendre polynomials.

In preferred embodiments of the method, the step of determining the temperature characteristic includes partitioning the range of the plurality of different temperatures into a plurality of intervals and calculating a slope of the temperature characteristic for each interval of the partitioning. Further, the step of correcting is based on the slopes of the intervals between the current temperature and the reference temperature and a width of these intervals. In this way, irrespective of any potential non-linearity of the temperature characteristics only linear terms can have to be dealt with in the step of correcting the imaginary part of the impedance. Preferably, the partitioning is executed such that a density of intervals is larger in regimes of the temperature characteristic with non-linearity than in substantially linear regimes of the temperature characteristic.

In another aspect of the invention, a capacitive measurement system is provided that includes at least one capacitive sensor member in an installed state, a capacitive measurement circuit and an evaluation and control unit.

The capacitive measurement circuit is connected to the at least one capacitive sensor member and is configured for determining a complex impedance of an unknown capacitance from a complex sense current through the at least one capacitive sensor. The complex sense current through the at least one capacitive sensor is indicative of an unknown impedance that may represent a position of an object relative to the at least one capacitive sensor member.

The evaluation and control unit is connected to the capacitive measurement circuit for receiving data signals and is configured:
  to control the capacitive measurement circuit to carry out an impedance measurement of the unknown capacitance at a current temperature and determine the real part and the imaginary part of the measured impedance,
  based on the real part determined at the current temperature and determined temperature characteristics of both the real part and the imaginary part, to correct the imaginary part of the impedance determined at the current temperature.

The benefits described in context with the method of operating a capacitive measurement system disclosed herein apply to the capacitive measurement system to the full extent.

Preferably, the evaluation and control unit is configured to automatically execute steps of the embodiments of the methods disclosed herein. In some embodiments, these steps may include carrying out the calibration measurement. In other embodiments, carrying out the steps of the calibration measurement are omitted, and temperature characteristics of both the real part and the imaginary part of the determined impedances have been obtained in a separate calibration measurement, and are provided for use to the evaluation and control unit.

Preferably, the determined temperature characteristics of both the real part and the imaginary part of measured impedances are results of an earlier carried out calibration measurement, reside in a digital data memory unit of the capacitive measurement system and can be retrieved by an electronic processor unit of the capacitive measurement system.

Preferably, the capacitive measurement system is configured to be installed in a vehicle for a vehicular application. The vehicular application may be formed, without being limited to, as a steering wheel or a vehicle seat. In this way, capacitive measurement systems including a temperature compensation without the need for an extra temperature-sensitive sensor member can be provided in vehicular applications such as, but not limited to, seat occupation detection, seat belt reminder (SBR) systems, activation control for an auxiliary restraint system (ARS) or Hands Off Detection (HoD) systems.

The term "vehicle", as used in this application, shall particularly be understood to encompass passenger cars, trucks, semi-trailer tractors and buses.

In yet another aspect of the invention, a software module for controlling an automatic execution of steps of the method disclosed herein is provided.

The method steps to be conducted are converted into a program code of the software module, wherein the program code is implementable in a digital data memory unit of the capacitive measurement system and is executable by a processor unit of the capacitive management system. Preferably, the digital memory unit and/or processor unit may be a digital memory unit and/or a processor unit of the evaluation and control unit of the capacitive measurement system. The processor unit may, alternatively or supplementary, be another processor unit that is especially assigned to execute at least some of the method steps.

The software module can enable a robust and reliable execution of the method and can allow for a fast modification of method steps.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
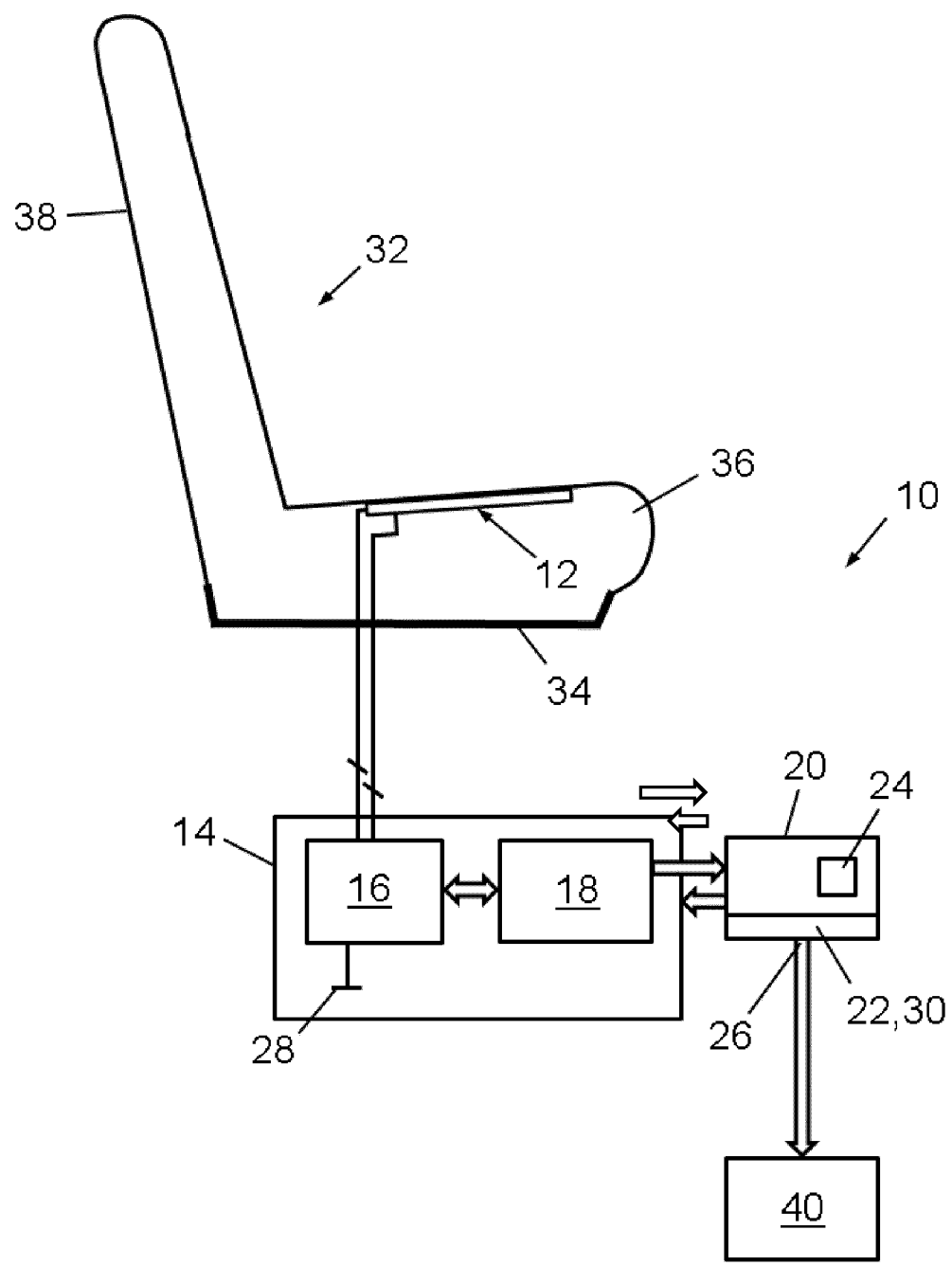
FIG. 1 schematically illustrates a capacitive measurement system in accordance with the invention in an embodiment as a seat occupation detection and classification system for a vehicle seat, FIG. 2 schematically illustrates an embodiment of a capacitive measurement system for Hands Off detection in a vehicle steering wheel.

FIG. 1 schematically illustrates a capacitive measurement system 10 in accordance with an embodiment of the invention. The capacitive measurement system 10 is configured to be installed in a vehicle seat 32 (shown in FIG. 1 in a side view) of a vehicle for the purpose of seat occupation detection and classification.

The vehicle seat 32 is designed as a driver's seat of a passenger car and includes a seat structure (not shown) by which it is erected on a passenger cabin floor of the passenger car, as is well known in the art.

The vehicle seat 32 further includes a seat base 34 supported by the seat structure and configured for receiving a seat cushion 36 for providing comfort to a seat occupant. The seat cushion 36 of the vehicle seat 32 comprises a seat foam member made from a foam material and a fabric cover, which has been omitted in FIG. 1. The seat base 34 and the seat cushion 36 are provided for supporting a bottom of the seat occupant. A backrest 38 of the vehicle seat 32 is provided as usual for supporting a back of the seat occupant.

The capacitive measurement system 10 includes a capacitive sensor member 12 that is installed in the vehicle seat 32, a capacitive measurement circuit 14 and an evaluation and control unit 20. The capacitive sensor member 12 is located on the A-surface of the seat cushion 36, underneath the fabric cover. The capacitive measurement circuit 14 and the evaluation and control unit 20 are installed in the vehicle, remote from the vehicle seat 32. An output port 26 of the evaluation and control unit 20 is connected to an airbag control unit 40 of the vehicle.

Figure 2:
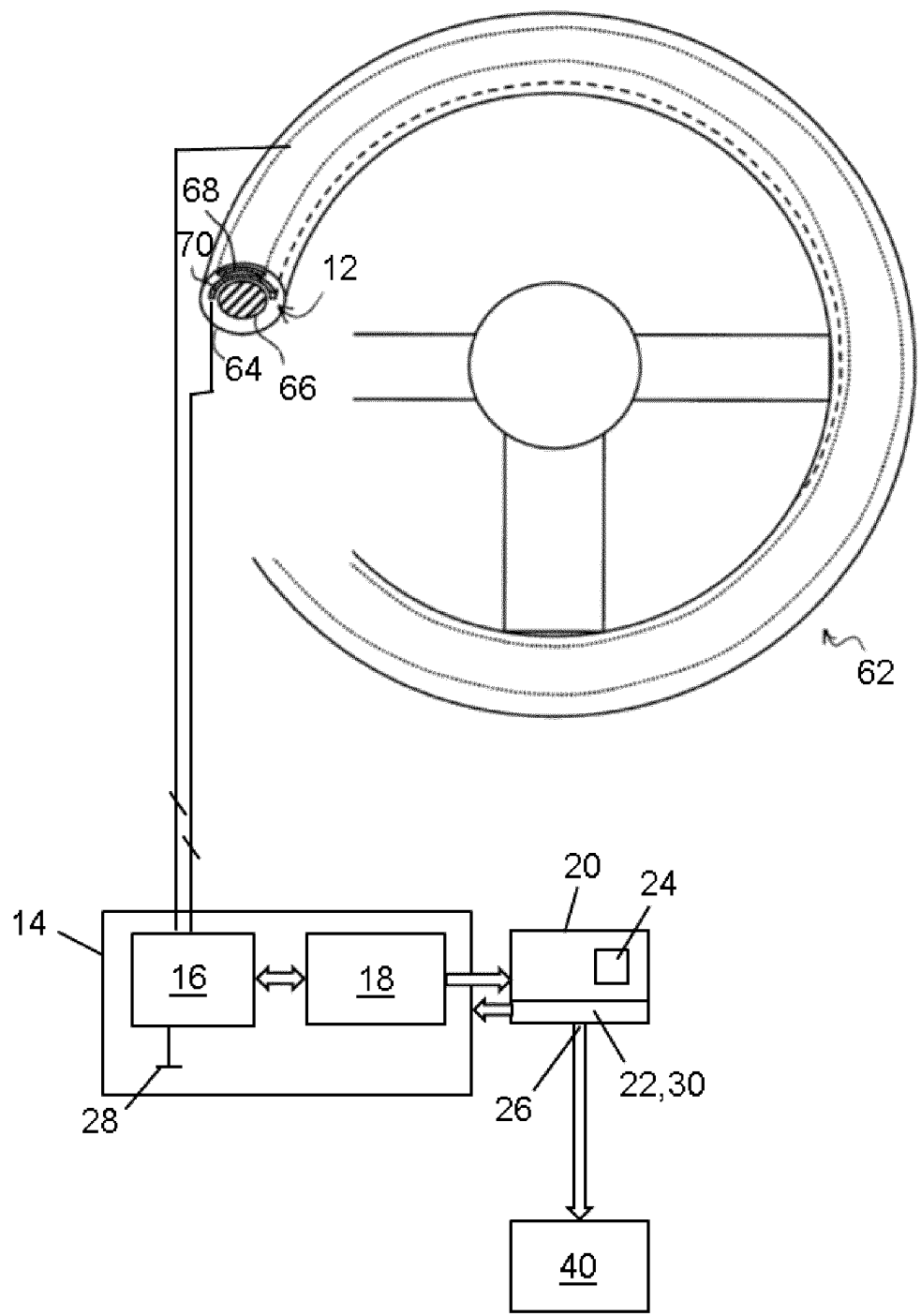

FIG. 2 shows an embodiment of the invention in an Hands Off detection system. FIG. 2 shows in particular a partial sectional view of a steering wheel comprising a capacitive sensor member 12 integrated therein. The capacitive sensor member 12 is integrated in a foam material, e.g. a polyurethane (PUR) foam, of the steering wheel 62 between a leather trim 64 and the metal steering wheel frame 66. In some cases, a wheel heating system is integrated, too. In such a case, the capacitive sensor member 12 is arranged above the heater (i.e. between the heater and the leather trim).

The capacitive sensor member 12 comprises e.g. a sensing electrode 68 and a shielding electrode 70 and is configured for detecting or measuring the capacitance between the sensing electrode 68 and the car chassis. The sensing electrode 68 and the shielding electrode 70 extend along the circumference of the steering wheel 62. Both the sensing electrode 68 and the shielding electrode 70 are electrically connected to the capacitive measurement circuit 14. The capacitive measurement circuit 14 is configured to keep the sensing electrode 68 and the shielding electrode 70 at the same AC potential, in terms of amplitude and phase. It follows that at any point in time, the electric field between the sensing electrode 68 and the shielding electrode 70 substantially cancels and the sensitivity of the sensing electrode 68 is, consequently, directed only in the direction away from the shielding electrode 70, i.e. into the detection space. When the driver grasps the steering wheel 62, capacitive coupling between the sensing electrode 68 and the vehicle chassis is increased compared to the situation, in which the driver has no hand on the steering wheel 62.

Figure 3:
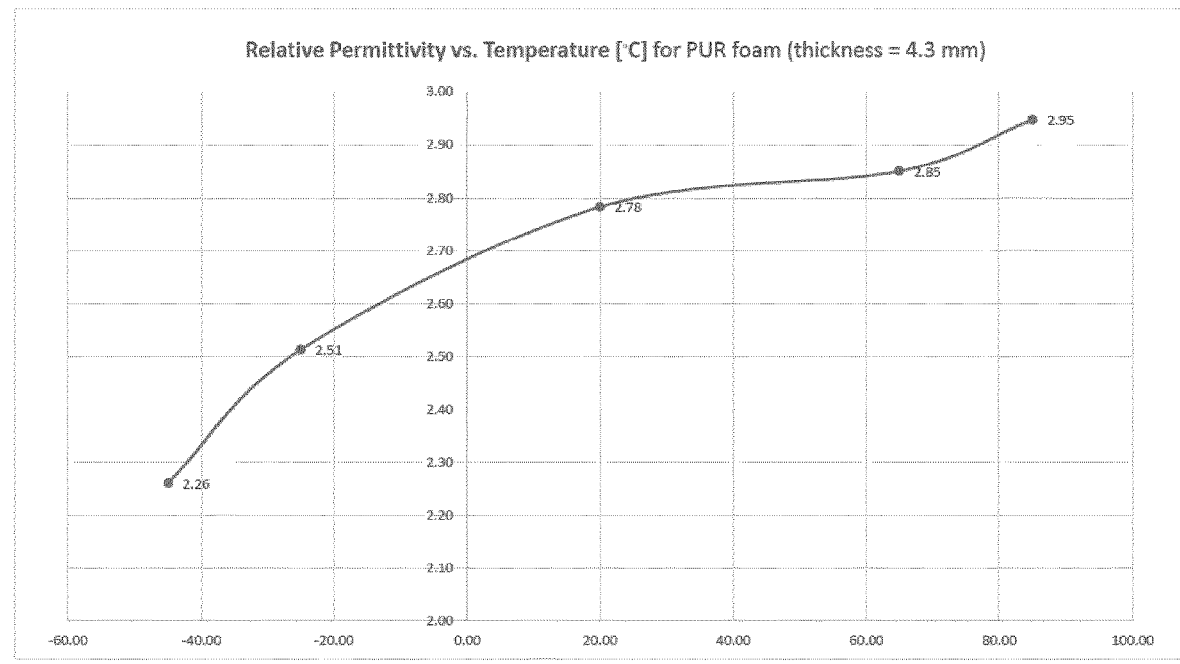
FIG. 3 shows a plot of a temperature characteristic of the relative permittivity of a PUR foam material employed e.g. in the steering wheel pursuant to FIG. 2.

The polyurethane (PUR) material employed in the seat cushion 36 of the vehicle seat 32 or the rim of the steering wheel 62 exhibits a variation of its electromagnetic properties with temperature. FIG. 3 shows a plot of a temperature characteristic of the relative permittivity of a PUR material as used e.g. in a vehicle steering rim. With the capacitive sensor member 12 being embedded in the foam material and therefore in in close proximity to the PUR material, an output signal of the capacitive sensor member 12 would be affected by the varying relative permittivity of the seat cushion material if no measures for compensation of temperature influences were taken. Similarly a temperature effect on the electrical properties of the sensor material itself may affect the measurement without temperature compensation.

The capacitive measurement circuit 14 includes an impedance measurement circuit 16 and a signal processing unit 18. The impedance measurement circuit 16 of the capacitive measurement circuit 14 is connected to the capacitive sensor member 12 and is configured for determining a complex impedance of an unknown capacitance from a complex sense current through the capacitive sensor member 12. The unknown capacitance represents a position of an object relative to the capacitive sensor member 12. The temperature influence by the variation of the permittivity of the PUR seat cushion material or steering wheel material would be detectable in both the real part and the imaginary part of a measured complex impedance and thus, without a compensation of temperature influences, would potentially be leading to a large measurement error.

The impedance measurement circuit 16 includes a signal voltage source (not shown) that is configured for providing, with reference to an AC ground potential 28, a periodic electrical measurement signal at an output port, and sense current measurement means that are configured to measure complex sense currents with reference to a reference voltage. The sense current measurement means may be formed as a transimpedance amplifier, which is connected to an antenna electrode of the capacitive sensor member 12 and which converts a current flowing into the antenna electrode of the capacitive sensor member 12 into a voltage, which is proportional to the current flowing into the antenna electrode. In principle, any other sense current measurement means could be employed that appears to be suitable to those skilled in the art.

The evaluation and control unit 20 is connected to the signal processing unit 18 of the capacitive measurement circuit 14 for receiving data signals. The evaluation and control unit 20 is configured to control the capacitive measurement circuit 14 to carry out an impedance measurement of the unknown capacitance at a current temperature and determine the real part and the imaginary part of the measured (complex) impedance.

In the following, an embodiment of a method of operating the capacitive measurement system 10 pursuant to FIG. 1 or FIG. 2 for compensation of temperature influences will be described. A flowchart of the method is provided in FIG. 6. In preparation of operating the capacitive measurement system 10, it shall be understood that all involved units and devices are in an operational state and configured as illustrated in FIG. 1 or FIG. 2.

In order to be able to automatically carry out the method, the evaluation and control unit 20 comprises a software module 30 (FIG. 1 or 2). The method steps to be conducted are converted into a program code of the software module 30. The program code is implemented in a non-transitory computer-readable medium such as a digital data memory unit 22 of the evaluation and control unit 20 and is executable by a processor unit 24 of the evaluation and control unit 20. Alternatively, the software module 30 may as well reside in and may be executable by a control unit of the vehicle, for instance by the airbag control unit 40, and established data communication means between the evaluation and control unit 20 and the airbag control unit 40 of the vehicle would be used for enabling mutual transfer of data.

In a calibration part of the method, a calibration measurement is carried out. In the calibration measurement, a plurality of complex impedances is determined at a plurality of different temperatures in a first step 50, wherein one complex impedance is determined at each temperature. A range of the plurality of different temperatures includes a reference temperature $T_{ref}$ (FIG. 4).

Figure 4:
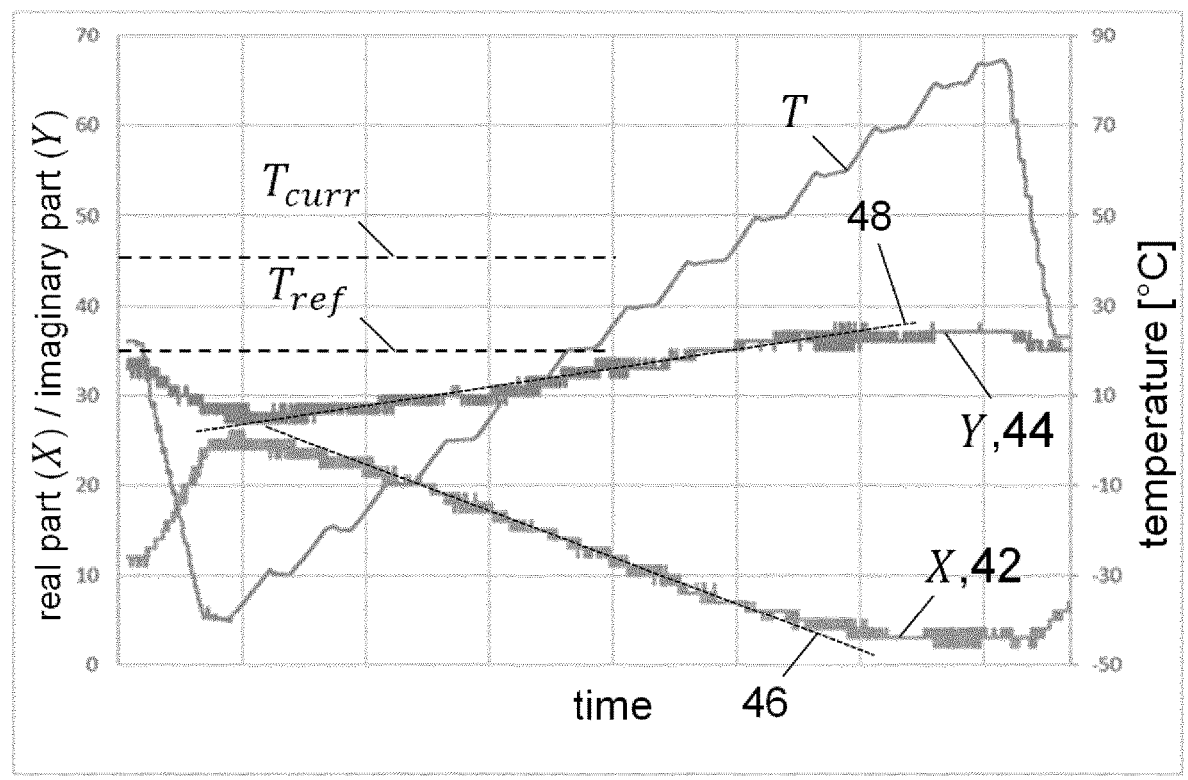
FIG. 4 shows results of a calibration measurement of real parts and imaginary parts of determined impedances across a temperature range.

FIG. 4 shows results of the calibration measurement of real parts and imaginary parts of determined impedances while the temperature is lowered from about +20° C. to −40° C. and is then ramped up across a temperature range between −40° C. and about +85° C. The temperature range includes the reference temperature $T_{ref}$ of +20° C. The real part X of the measured impedance, i.e. the resistance, exhibits an essentially linear decrease with increasing temperature for temperatures up to about +40° C., and a non-linearity above this temperature. The imaginary part Y of the measured impedance, i.e. the capacitance, exhibits a linear decrease at a temperature variation from +20° C. to −40° C., and an essentially linear increase during a temperature variation from −40° C. to about +60° C., with a non-linear portion above +60° C.

In a next step 52 of the calibration measurement, temperature characteristics 42, 44 of both the real part X and the imaginary part Y of the determined impedances are determined by applying a fitting procedure on the real parts of the determined impedances and by applying a fitting procedure on the imaginary parts of the determined impedances to obtain a closed formula for describing the respective temperature characteristic 42, 44.

The closed formulas obtained by the fitting procedure are formed by linear functions in temperature, which in a temperature range between −40° C. and about +60° C. is a sufficient approximation. By determining the temperature characteristics 42, 44 of both the real part X and the imaginary part Y of the determined impedances, the calibration measurement is completed. The closed formulas representing the temperature characteristics 42, 44 are stored in the digital data memory unit 22 of the evaluation and control unit 20 in a final step 54. The closed formulas representing the temperature characteristics 42, 44 can of course be used in other, identically designed and identically installed capacitive measurement systems 10.

In next steps of the method, the capacitive measurement circuit 14 is controlled 56 by the evaluation and control unit 20 to carry out an impedance measurement of the unknown capacitance at a current temperature $T_{curr}$ and to determine 58 the real part and the imaginary part of the measured impedance. In another step 60 of the method, the imaginary part of the impedance determined at the current temperature $T_{curr}$ is corrected by the evaluation and control unit 20 based on the real part determined at the current temperature $T_{curr}$ and the determined temperature characteristics 42, 44 of both the real part and the imaginary part.

The step 60 of correcting the imaginary part of the impedance determined at the current temperature $T_{curr}$ can be carried out in multiple ways. In this specific embodiment, the step 60 of correcting the determined imaginary part of the determined impedance is carried out according to linear transfer function $$Y_{ref} = Y_{curr} + X_{curr} \cdot a_1 + a_0$$

wherein $Y_{ref}$ denotes the corrected imaginary part of the impedance related to the reference temperature $T_{ref}$, $Y_{curr}$ denotes the uncorrected imaginary part of the impedance determined at the current temperature $T_{curr}$, $X_{curr}$ denotes the real part of the impedance determined at the current temperature $T_{curr}$, and $a_0$ and $a_1$ are constant numerical values obtained by carrying out the steps 50, 52 of the calibration measurement.

Obviously, constant numerical value $a_1$ is related to a ratio of the slope of the temperature characteristic 44 of the imaginary part of determined complex impedances to the slope of the temperature characteristic 42 of the real part of determined complex impedances. Both the slopes can readily be obtained from the linear functions 46, 48 representing the temperature characteristics 42, 44 determined during the calibration measurement (FIG. 4). Constant numerical value $a_0$ serves to adjust an offset between the temperature characteristics 42, 44 of the real part and the imaginary part of determined complex impedances, respectively.

Figure 6:
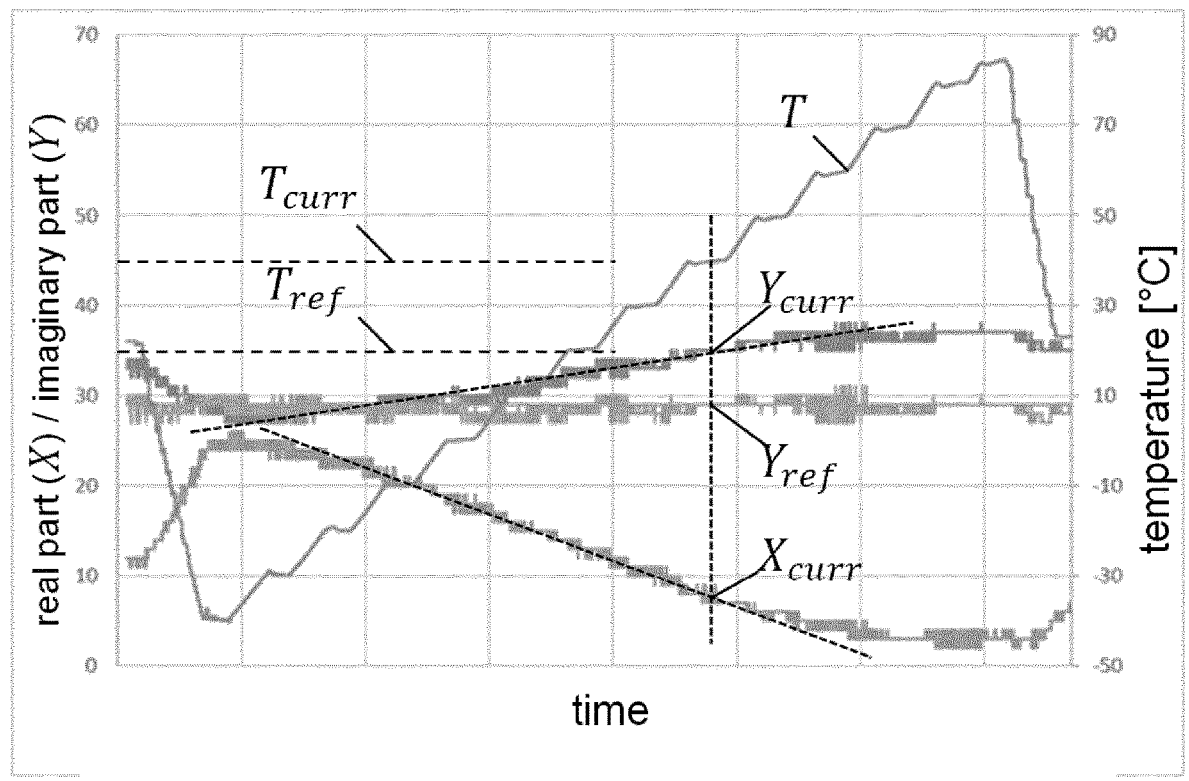
FIG. 6 shows the effect of applying the method pursuant to FIG. 5 on the imaginary part of determined impedances.
Figure 5:
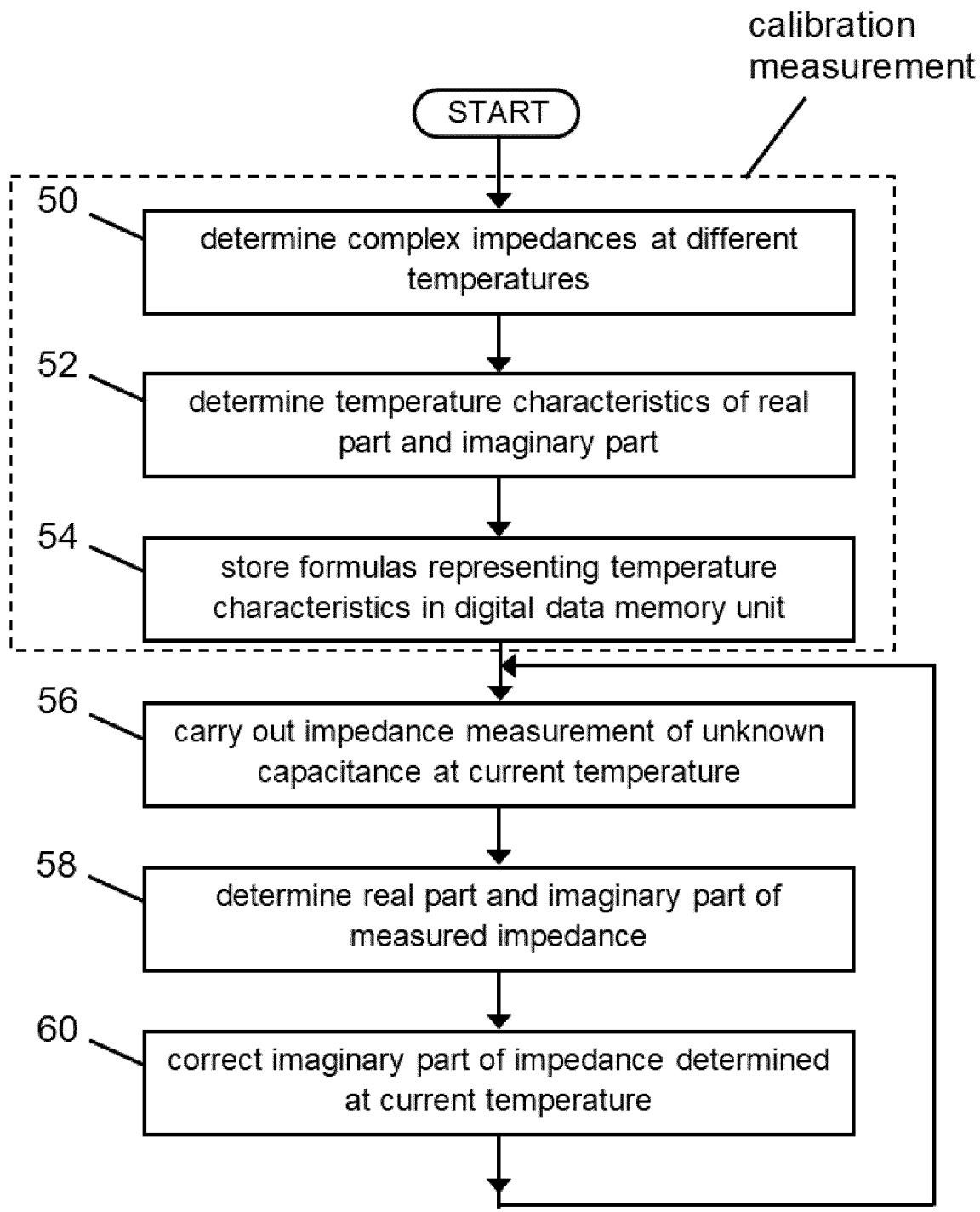
FIG. 5 is a flow chart of a method in accordance with the invention of operating the capacitive measurement system pursuant to FIG. 1 or FIG. 2 for compensation of temperature influences.

FIG. 6 shows the effect of applying the method pursuant to FIG. 5 on the imaginary part of the impedance Y determined at the current temperature $T_{curr}$, which is corrected to the corrected imaginary part of the impedance $Y_{ref}$ and is thereby related to the reference temperature $T_{ref}$.

In an alternative embodiment, the step of determining the temperature characteristics may include applying a fitting procedure to obtain closed formulas that are formed as polynomials of degree 2 in temperature for better adaptation to the measured real parts and imaginary parts of the measured impedance. The polynomials may be selected as orthogonal polynomials, for instance as Chebyshev polynomials or as Legendre polynomials. If a higher precision for representing the temperature characteristics is required, the degree of the polynomial may be increased by one, and the respective coefficient may be calculated in an extension of the fitting procedure, without having to repeat the complete fitting procedure.

In such embodiments, the step of correcting the determined imaginary part may include obtaining a current temperature $T_{curr}$ from the real part of the impedance determined at the current temperature $T_{curr}$ and the determined temperature characteristic of the real part. This can be accomplished by searching the roots (i.e. temperatures) of an equation, in which the polynomial of degree 2 yields the real part of the determined impedance. Further, the obtained current temperature $T_{curr}$ and the determined imaginary part temperature characteristic can be used for determining a correction amount for the imaginary part.

In another alternative embodiment, the step of determining the temperature characteristic may include partitioning the range of the plurality of different temperatures into a plurality of intervals and calculating a slope of the temperature characteristic for each interval of the partitioning. In other words, the temperature characteristic is approximated by a polygon. Further, the step of correcting is based on the slopes of the intervals between the current temperature $T_{curr}$ and the reference temperature $T_{ref}$, and a width of these intervals.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A method of operating a capacitive measurement system for compensation of temperature influence, the capacitive measurement system configured to be installed in a vehicle seat or a vehicle steering wheel and including at least one capacitive sensor member being in an installed state and a capacitive measurement circuit that is configured for determining a complex impedance of an unknown capacitance from a complex sense current through the at least one capacitive sensor member, the method comprising at least the following steps:
   carrying out a calibration measurement by:
      determining a plurality of complex impedances at a plurality of different temperatures, at least one complex impedance at each temperature, wherein a range of the plurality of different temperatures includes a reference temperature ($T_{ref}$), and
      determining temperature characteristics of both the real part and the imaginary part of the determined impedances,
   carrying out an impedance measurement of the unknown capacitance at a current temperature ($T_{curr}$) and determining the real part and the imaginary part of the measured impedance,
   based on the real part determined at the current temperature ($T_{curr}$) and the determined temperature characteristics of both the real part and the imaginary part, compensating for temperature influence by correcting (60) the imaginary part of the impedance determined at the current temperature ($T_{curr}$).

2. The method as claimed in claim 1, wherein the step of correcting the determined imaginary part includes obtaining a current temperature ($T_{curr}$) from the real part of the impedance determined at the current temperature ($T_{curr}$) and the determined temperature characteristic of the real part, and using the obtained current temperature ($T_{curr}$) and the determined imaginary part temperature characteristic for determining a correction amount for the imaginary part.

3. The method as claimed in claim 1, wherein the step of correcting (60) the determined imaginary part of the determined impedance is carried out according to linear transfer function $$Y_{ref} = Y_{curr} + X_{curr} \cdot a_1 + a_0$$

wherein $Y_{ref}$ denotes the corrected imaginary part of the impedance related to the reference temperature $T_{ref}$, $Y_{curr}$ denotes the uncorrected imaginary part of the impedance determined at the current temperature $T_{curr}$, $X_{curr}$ denotes the real part of the impedance determined at the current temperature $T_{curr}$, and $a_0$ and $a_1$ are constant numerical values obtained by the steps of carrying out the calibration measurement.

4. The method as claimed in claim 1, wherein the step of determining the temperature characteristics includes applying a fitting procedure on the real parts of the determined impedances and applying a fitting procedure on the imaginary parts of the determined impedances to obtain a closed formula for describing the respective temperature characteristic.

5. The method as claimed in claim 4, wherein the closed formula obtained by the fitting procedure is formed as a polynomial of the temperature.

6. The method as claimed in claim 1, wherein the step of determining the temperature characteristics includes partitioning the range of the plurality of different temperatures into a plurality of intervals and calculating a slope of the temperature characteristic for each interval of the partitioning, and wherein the step of correcting is based on the slopes of the intervals between the current temperature ($T_{curr}$) and the reference temperature ($T_{ref}$) and a width of these intervals.

7. A capacitive measurement system including:
   at least one capacitive sensor member configured to be installed in a vehicle seat or a vehicle steering wheel and being in an installed state,
   a capacitive measurement circuit that is connected to the at least one capacitive sensor member and that is configured for determining a complex impedance of an unknown capacitance from a complex sense current through the at least one capacitive sensor member, an evaluation and control unit that is connected to the capacitive measurement circuit for receiving data signals and that is configured:
  to control the capacitive measurement circuit to carry out an impedance measurement of the unknown capacitance at a current temperature ($T_{curr}$) and to determine the real part and the imaginary part of the measured impedance, and
  based on the real part determined at the current temperature ($T_{curr}$) and the determined temperature characteristics of both the real part and the imaginary part, compensate for temperature influence by correcting the imaginary part of the impedance determined at the current temperature ($T_{curr}$).

8. The capacitive measurement system as claimed in claim 7, wherein the evaluation and control unit is configured to automatically execute steps of a method comprising:
  carrying out a calibration measurement by:
    determining a plurality of complex impedances at a plurality of different temperatures, at least one complex impedance at each temperature, wherein a range of the plurality of different temperatures includes a reference temperature ($T_{ref}$), and
    determining temperature characteristics of both the real part and the imaginary part of the determined impedances,
  carrying out an impedance measurement of the unknown capacitance at a current temperature ($T_{curr}$) and determining the real part and the imaginary part of the measured impedance,
  based on the real part determined at the current temperature ($T_{curr}$) and the determined temperature characteristics of both the real part and the imaginary part, correcting the imaginary part of the impedance determined at the current temperature ($T_{curr}$);
  wherein the step of correcting the determined imaginary part includes obtaining a current temperature ($T_{curr}$) from the real part of the impedance determined at the current temperature ($T_{curr}$) and the determined temperature characteristic of the real part, and using the obtained current temperature ($T_{curr}$) and the determined imaginary part temperature characteristic for determining a correction amount for the imaginary part.

9. The capacitive measurement system as claimed in claim 7 being configured to be installed in a vehicle for a vehicular application.

10. A non-transitory computer-readable medium for controlling automatic execution of steps of the method of claim 1, wherein method steps are stored on the computer-readable medium as a program code, and wherein the computer-readable medium comprises a part of the capacitive measurement system or of a separate control unit and is executable by a processor unit of the capacitive measurement system or of the separate control unit.

* * * * *